United States Patent Office 3,461,068
Patented Aug. 12, 1969

3,461,068
ESTERS OF TALL OIL PITCH AND POLYOXY-
ETHYLENE COMPOUNDS AND THEIR USE AS
DRILLING FLUID ADDITIVES
Dixon W. Peacock, Bartlesville, Okla., assignor to Phillips
Petroleum Company, a corporation of Delaware
No Drawing. Application Nov. 23, 1964, Ser. No. 413,316,
now Patent No. 3,379,708, dated Apr. 23, 1968, which
is a continuation-in-part of application Ser. No.
330,586, Dec. 16, 1963. Divided and this application
Feb. 26, 1968, Ser. No. 707,980
Int. Cl. C10m *3/20;* C09k *3/00*
U.S. Cl. 252—8.5                                5 Claims

ABSTRACT OF THE DISCLOSURE

Esters useful as drilling mud additives for oil base and aqueous base drilling muds are formed by heating a mixture of tall oil pitch and a polyoxyethylene compound under conditions of reflux for about 1 to 3 hours or at a temperature in the range of about 130–280° C. for about 1 to 3 hours at about atmospheric pressure.

This application is a division of my copending application Ser. No. 413,316 filed Nov. 23, 1964 now Patent No. 3,379,708, which is a continuation-in-part of application Ser. No. 330,586 filed Dec. 16, 1963, now abandoned.

This invention relates to drilling fluids. In one aspect it relates to drilling fluids such as aqueous, oil-base, and emulsion types of drilling fluids used in drilling deep wells such as oil and gas wells. In another aspect it relates to a method for preparing and using a simple drilling fluid which exhibits low fluid loss properties and other desirable rheological properties in illitic clay drilling fluid systems. In another aspect it relates to a flocculant for bentonitic clays. In still another aspect the invention relates to a novel composition of matter which has particular utility as a drilling fluid additive.

It is well known that in perforating the earthen formations to tap subterranean deposits such as gas or oil, the perforation is accomplished by well drilling tools and a drill fluid. The drilling fluid serves to cool and lubricate the drill bit, to carry the cuttings to the surface as the drilling fluid is circulated in and out of the well, to support at least part of the weight of the drill pipe and drill bit, to provide a hydrostatic pressure head to prevent caving of the walls of the well bore, to deposit on the surface of the well bore a filter cake which acts as a thin, semi-impervious layer to prevent undue passage therethrough of fluids, and to perform other functions as are well known in the drilling art.

It is important that the drilling fluid exhibit a relatively low rate of filtration or fluid loss in addition to having desirable rheological properties such as viscosity and gel strengths. It is also important that the drill fluid system should be kept as simple and inexpensive as possible in order to avoid undue expense in the drilling of a well.

It is therefore an object of this invention to provide an illitic clay base drilling fluid having low fluid loss characteristics. It is also an object of this invention to provide a novel composition of matter which is useful as a drilling fluid additive. Still another object of the invention is to provide a method for controlling the fluid loss properties of an illitic clay base drilling fluid without adversely affecting the rheological properties of the drilling fluid. Still another object is to provide a flocculant for hydrophilic bentonitic clays and a dispersant for organophilic bentonitic clays. Still another object is to provide a drilling or well-working fluid which is effective in drilling fluids contaminated with salts such as sodium chloride and calcium sulfate as well as being effective in drilling fluids wherein these contaminating salts are absent. Still another object is to provide an additive for oil base drilling fluids containing organophilic bentonitic clays. The provision of a concentrate to facilitate preparation of an oil base drilling fluid in the field is yet another object of the invention. Further objects and advantages of this invention will become apparent to those skilled in the art after studying the disclosure of the invention including the detailed description of the invention.

Broadly, the invention contemplates a novel composition of matter prepared by reacting tall oil pitch with a polyethylene glycol or with a mono-ether or mono-ester of a polyethylene glycol. Such reaction product is an ester which can be represented by the formula

wherein $n$ is an integer of 4 to 500, R contains 0 to 100 carbon atoms and is selected from the group consisting of hydrogen and alkyl, aryl, alkaryl, aralkyl, cycloalkyl, cycloalkylalkyl, alkylcycloalkyl and acyl radicals, and R′ is an acyl radical from an acid constituent of tall oil pitch.

Some examples of applicable esters are those prepared by esterification of tall oil pitch with polyoxyethylene compounds of the general formula

where $n$ is 4–500, preferably 6–100, and R is hydrogen, methyl, ethyl, isopropyl, isobutyl, hexyl, octyl, dodecyl, octadecyl, triacontyl, hexacontyl, phenyl, 1-naphthyl, o-tolyl, m-ethylphenyl, m-hexylphenyl, o-octylphenyl, p-isooctylphenyl, p-nonylphenyl, o-decylphenyl, m-octadecylphenyl, benzyl, 2-phenyloctyl, cyclohexyl, 3-cyclohexylpropyl, 3-methylcyclopentyl, acetyl, propionyl, lauroyl, stearoyl, and the like. The nonylphenyl derivatives, e.g., p-nonylphenoxypoly(ethyleneoxy) ethanol, in which $n$ has a value of 6–100, are especially good.

The additives can be utilized in water-base drilling fluids containing illitic clays to reduce the fluid loss properties of the drilling fluid without appreciably affecting the rheological properties of the drilling fluid. Esters of tall oil pitch and polyoxyethylated nonylphenols are especially effective as fluid loss control additives in such water-base fluids and are particularly useful in low solids, illitic clay-containing water-base fluids containing salt (sodium chloride) and gypsium or anhydrite (calcium sulfate), where fluid loss control is often difficult to obtain.

The additives can also be utilized in oil-base drilling fluids containing organophilic bentonitic clays (Bentones) to increase viscosity particularly when polar compounds such as sulfonated asphalt are added to the drilling fluid for fluid loss control. When about 2 to 3 pounds per barrel of the tall oil pitch ester is added to an oil-base drilling fluid containing sulfonated asphalt, the viscosity of the system is raised sufficiently to maintain weighting material such as barite in suspension without appreciably affecting the fluid loss control provided by the addition of the sulfonated asphalt.

The additives of the invention are flocculants for bentonitic clays in water-base systems and therefore are useful for rejecing bentonitic clays from drilling fluids and are useful for drilling through bentonitic clay formations with water-base drilling fluids.

Although the concentration of the additive for fluid loss control in illitic clay systems can vary over a wide range, it will usually be maintained in the range of about 4 to 20 pounds of additive per barrel of drilling fluid and the concentration will preferably be maintained between about 6 and 10 pounds of additive per barrel of drilling fluid.

The aqueous drilling fluids of this invention need contain only water and a finely-divided illitic clay; however, it is within the scope of this invention to incorporate the novel fluid loss additive into a drilling fluid containing other additives or to add other materials, except bentonitic clays, to the drilling fluid containing the novel fluid loss additive.

The addition of the composition of the invention in Bentone-containing, oil-base drilling fluid systems for viscosifying such drilling fluid will usually be at least an amount equal to that of the polar compound that was added to control fluid loss. Often a small amount of the composition, e.g., about 2–3 pounds per barrel of fluid, will increase the viscosity and gel strengths of an oil-base fluid system sufficiently to suspend the necessary or desired amount of weighting agent. When relatively large amounts of weighting agent are to be added to the system, it may be desirable to add as much as 20 to 30 pounds of the composition per barrel of drilling fluid.

In the preparation of oil-base drilling fluids containing Bentones it is essential that the Bentones be dispersed completely in the system so as to obtain maximum viscosity rapidly. Rapid dispersion of Bentones in oil requires a milling operation utilizing a mill such as a paint mill or colloid mill and a dispersion agent. The rapid preparation of such dispersion in the field with normal drilling fluid mixing equipment is difficult if not impossible.

I have found that the tall oil pitch esters of the invention can be utilized in the preparation of Bentone-containing oil base drilling fluids and that a concentrate of Bentone and oil can be prepared at a convenient location and shipped as a grease-like solid to the drilling site where it can be mixed with oil utilizing normal drilling fluid mixing equipment to produce an oil-base drilling fluid of desired viscosity. The tall oil pitch ester performs as a viscosifier for the Bentone-containing oil base drilling fluid as well as a dispersion agent for dispersing the Bentone in the oil.

Bentones are organophilic bentonite clays. The treatment of Bentonite clay to produce a Bentone is well known.

Illitic clays are hydrous micas and are related to true micas but contain less potassium. The properties of illitic clays are described in Rogers, Composition and Properties of Oil Well Drilling Fluids, second edition, Gulf Publishing Company, Houston (1953) at 280–282.

The following examples will be helpful in attaining an understanding of this invention; however, the specific polyoxyethylene compounds and the specific details for preparing the reaction products of the example are merely illustrative of a preferred embodiment of the invention and are not to be construed as unduly limiting the invention.

EXAMPLE I

Esters for use as drilling mud additives were prepared by heating together tall oil pitch, Tallene, and a polyoxyethylated nonylphenol surfactant at about 135° C. for approximately 2½ hours. Tallene contains 35–50% fatty acids; 24–32% resin acids; 22–32% sterols, higher alcohols, etc.; a softening point between 88–108° F.; an acid number between 60–75; and a saponification number between 90–110. The reaction product, without any separation or purification, was used as the additive. Table I shows the ratio of tall oil pitch to surfactant employed in each of 4 additive preparations.

TABLE I

| Ester additive: | Reactants |
|---|---|
| 1 | 50 parts tall oil pitch and 65 parts p - nonylphenoxypoly(ethyleneoxy)ethanol wherein $n=50$. |
| 2 | 3 parts tall oil pitch and 1 part p - nonylphenoxypoly(ethyleneoxy)ethanol wherein $n=30$. |
| 3 | 2 parts tall oil pitch and 1 part p - nonylphenoxypoly(ethyleneoxy)ethanol wherein $n=30$. |
| 4 | 4 parts tall oil pitch and 5 parts p - nonylphenoxypoly(ethyleneoxy)ethanol wherein $n=9$. |

Drilling fluids of various compositions were made up, and each of the ester additives in Table I was tested as a fluid loss control agent by the method of "API Recommended Practice, Standard Procedure for Testing Drilling Fluids," API RP 13B, first edition, November 1962, section 3, Filtration, Low Temperature Test, pages 8 and 9. In each instance the fluid loss was determined on the fresh drilling fluid after incorporation of the fluid loss control additive and also on additive-containing drilling fluid which had aged for 16 hours at 80° C. Each drilling fluid without ester additive was used in a control test. The drilling fluid compositions and test results are summarized in Table II.

TABLE II

| Additive, g.[1] | 2 | 6 | 10 | 6 | 6 | 10 | 10 |
|---|---|---|---|---|---|---|---|
| McCracken clay, g | 25 | 25 | 25 | 25 | 25 | 25 | 25 |
| $H_2O$, cc | 350 | 350 | 350 | 350 | 350 | | |
| Saturated NaCl soln., cc | | | | | | 350 | 350 |
| $CaSO_4 \cdot 7H_2O$, g | | | | | | | 5 |
| M. V. CMC,[2] g | | | | | 0.5 | | |
| Diesel oil, cc | | | | | | 15 | |

| Fluid loss, cc.—Fresh drilling fluids | | | | | | | |
|---|---|---|---|---|---|---|---|
| Base drilling fluid (control) | 53.0 | 53.0 | 53.0 | 13.8 | 36.0 | 153.0 | 145.0 |
| Drilling fluid+additive 1 | 70.0 | 9.6 | 7.6 | 6.4 | 5.2 | 8.0 | 12.0 |
| Drilling fluid+additive 2 | 79.0 | 28.4 | 13.0 | 11.5 | 10.8 | 168.0 | 167.0 |
| Drilling fluid+additive 3 | 110.0 | 13.2 | 7.6 | 8.4 | 12.4 | 23.5 | 28.0 |
| Drilling fluid+additive 4 | 143.0 | 12.8 | 9.2 | 9.9 | 26.0 | 70.0 | 80.0 |

| Fluid loss, cc.—Drilling fluids aged 16 hours at 80° C. | | | | | | | |
|---|---|---|---|---|---|---|---|
| Base drilling fluid (control) | 47.0 | 47.0 | 47.0 | 12.0 | 30.0 | 143.0 | 143.0 |
| Drilling fluid+additive 1 | 84.0 | 11.4 | 5.0 | 7.2 | 6.0 | 9.8 | 14.6 |
| Drilling fluid+additive 2 | 64.0 | 44.0 | 14.6 | 9.2 | 10.4 | 140.0 | 150.0 |
| Drilling fluid+additive 3 | 85.0 | 15.4 | 6.7 | 7.2 | 11.7 | 35.0 | 26.0 |
| Drilling fluid+additive 4 | 115.0 | 28.2 | 8.8 | 9.8 | 33.0 | 67.0 | 72.0 |

[1] Weight of additive expressed in grams represents pounds of additive per barrel of drilling fluid.
[2] Medium viscosity (regular) Driscose, sodium carboxymethylcellulose.

The results in Table II show that the ester additives in concentrations greater than 2 pounds per barrel of drilling fluid served as fluid loss control agents. In general, the reduction in the quantity of fluid lost from the drilling fluid was especially great in the drilling fluid containing salt or salt and gypsum.

EXAMPLE II

Tall oil pitch esters were prepared by heating the reactants as described in Example I to 270° C. while bubbling $CO_2$ through the mixture to remove water formed by the reaction. In this manner the reaction time could be reduced to about 1 hour. Esterification appeared to progress rapidly at about 250° C. Esters were also prepared wherein a solvent such as xylene was used to reduced the viscosity of the mixture.

Ester additive No. 5 was prepared by heating 104 parts by weight of tall oil pitch and 140 parts by weight of p-nonylphenoxypoly(ethyleneoxy)ethanol wherein $n=50$ at about 270° C. for about 1 hour while bubbling $CO_2$ through the mixture.

Ester additive No. 6 was prepared by heating 218 parts by weight of tall oil pitch; 135 parts by weight of p-nonylphenoxypoly(ethyleneoxy)ethanol wherein $n=30$; 40 parts by weight of glycerine; and 215 parts by weight of xylene at about 270° C. for about 1 hour while bubbling $CO_2$ through the mixture. The product contained 58 weight percent of the ester.

EXAMPLE III

Ester additives 5 and 6 were added to aqueous drilling fluids containing an illitic clay marketed as P-95 clay and the treated drilling fluids were tested as in Example I. The results are shown in Table III:

TABLE III
[Fluid loss in 25 lb./bbl. P-95 drilling fluid]

| Treatment, lb./bbl. | 30 minute water loss aged 16 hours at 80° C. | | | |
|---|---|---|---|---|
| | 0 | 3 | 5 | 10 |
| Ester #5 | 28 | 5.2 | 3.2 | 1.8 |
| Ester #6 | 28 | 16.6 | 9.2 | 4.4 |
| Ester #6 [1] | 28 | 9.3 | 5.3 | 2.6 |

[1] Solvent-free basis, assuming no effect for the solvent.

The above results demonstrate the water loss control achieved with the esters prepared at the higher temperature.

EXAMPLE IV

An aqueous drilling fluid containing 20 weight percent kaolin and 4 weight percent bentonite was treated with ester #1. The properties of the drilling fluid and the results of the treatment are shown in the following Table IV.

TABLE IV.—FLOCCULATION OF BENTONITE

| Treatment, lb./bbl. | 0 | 3 |
|---|---|---|
| Plastic viscosity, cp. | 23 | Too thick to stir |

A 1 weight percent slurry of bentonite was prepared and treated with about 1 lb./bbl. of ester #1. The bentonite was substantially completely precipitated.

EXAMPLE V

A Bentone-oil concentrate was prepared in a colloid mill containing the following materials:

TABLE V

Concentrate formulation #1

| | Parts by weight |
|---|---|
| Diesel oil | 1200 |
| Bentone | 121 |
| Sulfonated asphalt | 50 |
| Acetone | 24 |

The mixture was milled to viscous liquid state. The mill will not handle a grease. The addition of 60 to 100 parts by weight of an ester of the invention with milling produces a concentrate having the consistency of a grease.

A drilling fluid was prepared according to the recipe of Table VI.

TABLE VI

Drilling fluid #1

| | Parts by weight |
|---|---|
| Diesel oil | 200 |
| Formulation #1 | 150 |
| Ester #6 | 20 |

After mixing for 30 minutes drilling fluid #1 was tested and 200 parts by weight of barite weighting material was added, followed by 30 minutes mixing. The weighted drilling fluid was tested. Results are shown in Table VII.

A drilling fluid designated as drilling fluid #2 was prepared without using a dispersion agent and colloid mill so as to compare with drilling fluid #1 in composition.

TABLE VII

Drilling fluid #2

| | Parts by weight |
|---|---|
| Diesel oil | 332 |
| Bentone | 13.1 |
| Sulfonated asphalt | 5.5 |
| Ester #6 | 20 |

Drilling fluid #2 was mixed for 30 minutes and tested. Then 200 parts by weight of barite was added and after mixing for 30 minutes the fluid was tested again. Results are shown in Table VIII.

TABLE VIII.—COMPARISON OF PREDISPERSED BENTONE-OIL DRILLING FLUID WITH CONVENTIONAL BENTONE-OIL FLUID

| Drilling Fluid | Cps. | | Lbs./100 ft. | | |
|---|---|---|---|---|---|
| | Apparent viscosity | Plastic viscosity | Yield point | Initial gel | 10 minute gel |
| #1 | 13 | 8 | 9 | 7 | 11 |
| #1+Barite | 21 | 14 | 13 | 9 | 13 |
| #2 | 9 | 5 | 7 | 6 | 6 |
| #2+Barite | 21 | 17 | 7 | 5 | 7 |

The 30-minute fluid loss from #1 weighted with barite was 6.4 cc. whereas the fluid loss from #2 weighted with barite was 11.4 cc.

The results above show that a drilling fluid prepared from the concentrate is superior to a drilling fluid prepared from the various components at the well site in the properties of viscosity, gel strength and fluid loss.

EXAMPLE VI

A diesel oil-Bentone mixture containing about 2 weight percent Bentone was used in the preparation of drilling fluids for suspending barite weighting material.

TABLE IX

| | Parts by weight |
|---|---|
| Oil-Bentone mixture | 450 |
| Sulfonated asphalt | 15 |
| Barite | 200 |

The above drilling fluid will not suspend barite.

TABLE X

| | Parts by weight |
|---|---|
| Oil-Bentone mixture | 430 |
| Sulfonated asphalt | 15 |
| Tall oil pitch ester #6 | 20 |
| Barite | 200 |

The above drilling fluid suspended barite satisfactorily. The 30 minute fluid (oil) loss was 12 cc.

TABLE XI

| | Parts by weight |
|---|---|
| Oil-Bentone mixture | 430 |
| Sulfonated asphalt | 15 |
| Tall oil pitch ester #6 | 20 |
| Zinc stearate | 5 |
| Barite | 200 |

The above drilling fluid suspended barite satisfactorily. The 30 minute fluid loss was 10.7 cc. The zinc stearate reduced fluid loss. The addition of 5 parts by weight of California (Coalinga) asbestos to the above drilling fluid increased the 30 minute fluid loss to 12.4 cc.

TABLE XII

| | Parts by weight |
|---|---|
| Oil-Bentone mixture | 195 |
| Diesel oil | 195 |
| Tall oil pitch ester #7 [1] | 23 |
| California (Coalinga) asbestos | 10 |
| Barite | 100 |

[1] Ester additive #7 was prepared by heating equal parts by weight of tall oil pitch and p-nonylphenoxypoly(ethyleneoxy)ethanol wherein $n=50$ in xylene. The product contained 59 weight percent ester.

The above drilling fluid suspended barite satisfactorily and had a 30 minute fluid loss of 34.5 cc.

I have found that 2 parts by weight of tall oil pitch should be reacted with from 1 to 6 or more parts by weight of polyoxyethylene compound for best results in water loss control; however, beneficial results are obtained when the reactants are utilized in proportions outside this range. The reaction conditions of the example are satisfactory but these conditions are not critical and simple routine experimentation will determine the optimum conditions for each ester.

I have found that esters prepard from tall oil and polyoxyethylene compounds do not provide any appreciable amount of water loss control, particularly in drilling fluids containing substantial amounts of salt or gypsum.

The esters of the invention do not change appreciably the viscosity and gel strength of the drilling fluid.

That which is claimed is:

1. A concentrate for use in preparing oil base drilling muds consisting essentially of organophilic bentonitic clay; a sufficient amount of hydrocarbon oil to form a grease; and an amount, sufficient to disperse said clay in said oil of the reaction product obtained by heating to a temperature in the range of about 130 to about 280° C. for about 1 to 3 hours at atmospheric pressure a mixture of tall oil pitch and a polyoxyethylene compound having the formula $R(OCH_2CH_2)_nOH$ wherein $n$ is an integer of 4 to 500, R contains 0 to 60 carbon atoms and is selected from the group consisting of hydrogen and alkyl, aryl, alkaryl, aralkyl, cycloalkyl, cycloalkylalkyl, alkylcycloalkyl, and acyl radicals.

2. In a process for drilling a well with well drilling tools wherein a drilling fluid selected from the group consisting of a water base drilling fluid containing illitic clay and oil base drilling fluids containing organophilic bentonitic clay is circulated in the well, the method of decreasing the fluid loss through the mud sheath formed on the wall of the well which comprises incorporating in said drilling fluid about 2 to 30 pounds per barrel of drilling fluid of an additive consisting essentially of the reaction product obtained by heating to a temperature in the range of about 130 to about 280° C. for about 1 to 3 hours at atmospheric pressure a mixture of tall oil pitch and a polyoxyethylene compound having the formula $$R(OCH_2CH_2)_nOH$$

wherein $n$ is an integer of 4 to 500, R contains 0 to 60 carbon atoms and is selected from the group consisting of hydrogen and alkyl, aryl, alkaryl, aralkyl, cycloalkyl, cycloalkylalkyl, alkylcycloalkyl and acyl radicals; and contacting the wall of the well with drilling fluid containing said additive.

3. The process of claim 2 wherein the drilling fluid is water base drilling fluid containing illitic clay.

4. The process of claim 2 wherein the drilling fluid is an oil base drilling fluid containing organophilic bentonitic clay.

5. The process of claim 2 wherein the drilling fluid is a water base drilling fluid containing illitic clay and the drilling fluid is contaminated with bentonitic clay.

References Cited

UNITED STATES PATENTS

| | | | |
|---|---|---|---|
| 2,531,812 | 11/1950 | Hauser | 252—8.5 |
| 2,921,028 | 1/1960 | Stratton | 252—49.7 |
| 2,627,514 | 2/1953 | Kirkpatrick et al. | 260—97.5 |
| 2,675,353 | 4/1954 | Dawson | 252—8.5 |
| 2,950,272 | 8/1960 | Kirkpatrick et al. | 260—104 |
| 3,236,769 | 2/1966 | Burdyn et al. | 252—8.5 |
| 3,238,164 | 3/1966 | Speck | 260—97.5 X |

HERBERT B. GUYNN, Primary Examiner

U.S. Cl. X.R.

252—28; 260—97, 103, 104